(12) United States Patent (10) Patent No.: US 7,646,535 B1
Heidt (45) Date of Patent: Jan. 12, 2010

(54) TRANSVERSE LIGHT REDUCTION IN A LIGHTED RETICLE

(75) Inventor: Gerald Lee Heidt, Nibley, UT (US)

(73) Assignee: Wasatch Photonics, Inc., Logan, UT (US)

( * ) Notice: Subject to any disclaimer, the term of this patent is extended or adjusted under 35 U.S.C. 154(b) by 369 days.

(21) Appl. No.: 11/855,020

(22) Filed: Sep. 13, 2007

Related U.S. Application Data

(60) Provisional application No. 60/825,559, filed on Sep. 13, 2006.

(51) Int. Cl.
*G02B 23/00* (2006.01)
(52) U.S. Cl. .......................... 359/428; 42/122
(58) Field of Classification Search ........... 359/424, 359/427, 428; 42/122
See application file for complete search history.

(56) References Cited

U.S. PATENT DOCUMENTS

| 5,283,689 A | * | 2/1994 | Carlough | 359/427 |
| 5,349,179 A | * | 9/1994 | Morley | 250/214 VT |
| 2004/0016168 A1 | * | 1/2004 | Thomas et al. | 42/122 |

* cited by examiner

*Primary Examiner*—Alessandro Amari
(74) *Attorney, Agent, or Firm*—Austin Rapp & Hardman

(57) ABSTRACT

An eyepiece assembly for use in a rifle scope may include an eyepiece that is made of a material that is transparent to light. A holographic reticle may be positioned within the eyepiece. The eyepiece assembly may also include a chrome reticle. The chrome reticle may be positioned so that the chrome reticle is aligned with the holographic reticle. A cover portion may be attached to the eyepiece.

13 Claims, 6 Drawing Sheets

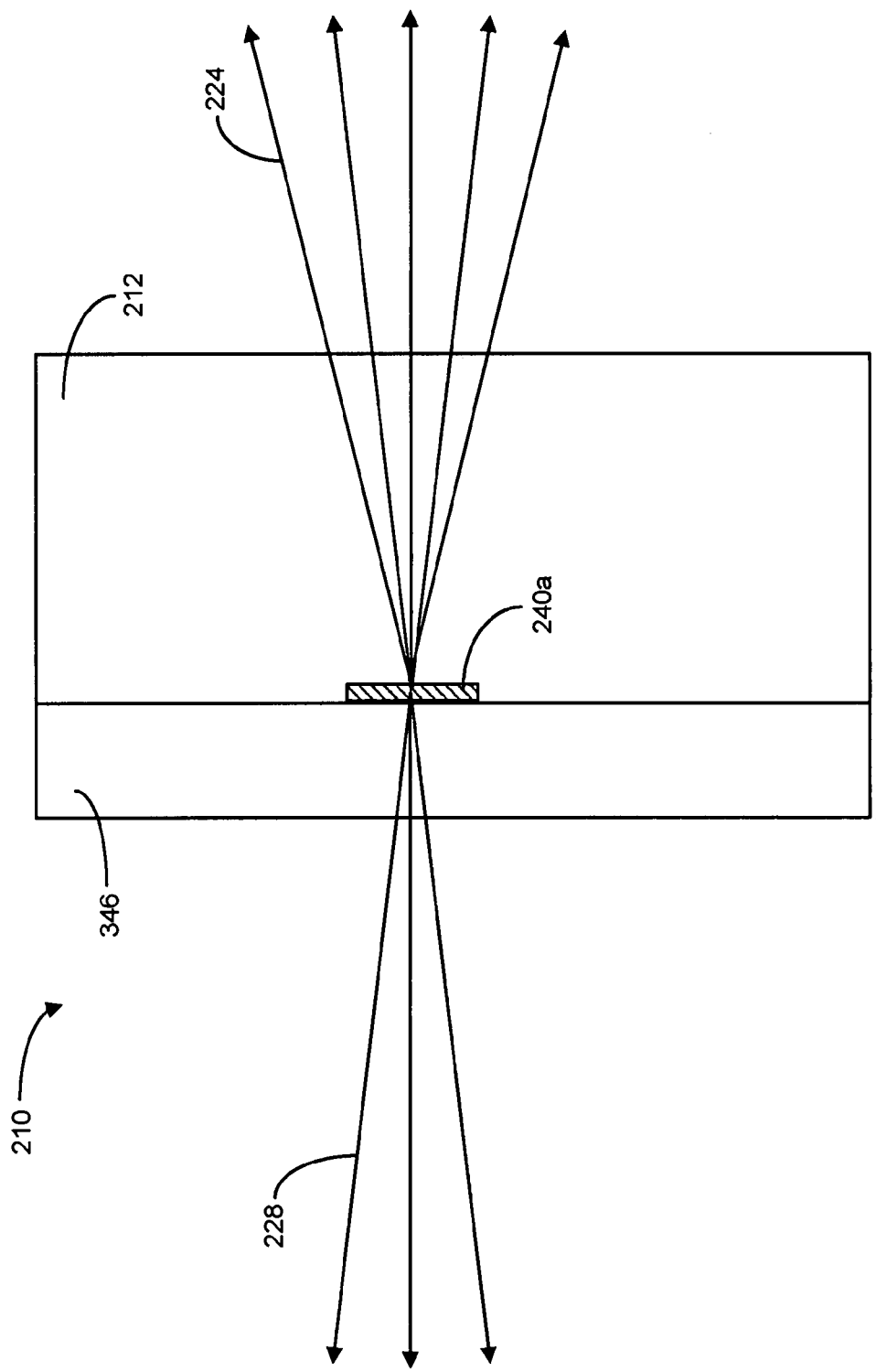

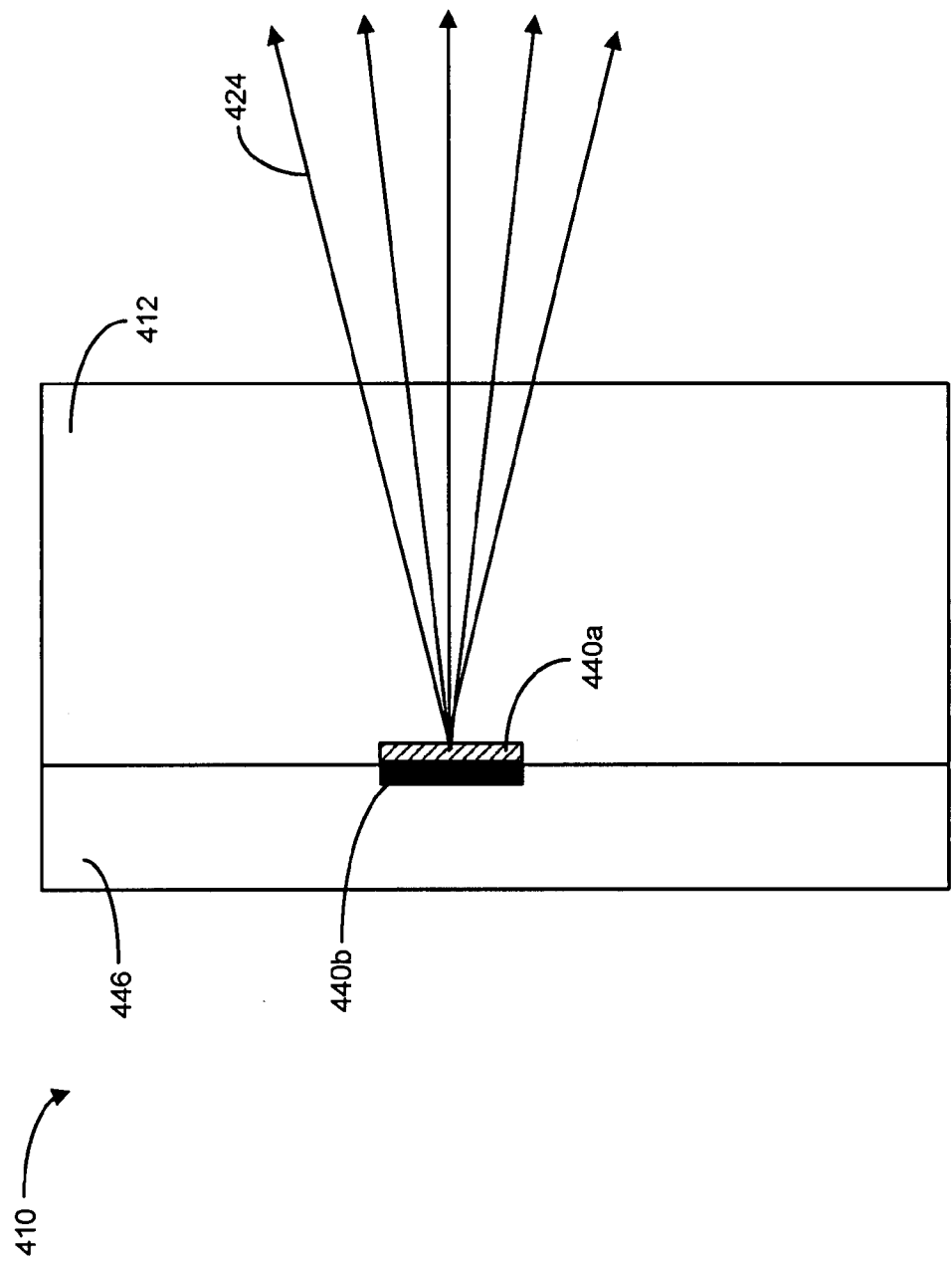

TRANSVERSE LIGHT REDUCTION IN A LIGHTED RETICLE

RELATED APPLICATIONS

This application claims the benefit of U.S. Provisional Patent Application No. 60/825,559 entitled "Transverse Light Reduction In A Lighted Reticle," which was filed on Sep. 13, 2006. This provisional patent application is expressly incorporated herein by reference.

TECHNICAL FIELD

The present disclosure relates generally to rifle scopes. More specifically, the present disclosure relates to an eyepiece assembly that may be used in connection with a rifle scope.

BACKGROUND

Rifles are often equipped with a scope in order to facilitate the user in aiming the weapon. This scope is an optical instrument through which the user may see the target and aim the weapon. Often, the rifle scope will include a reticle, which is sometimes referred to as cross-hairs. The user may aim the rifle by looking through the scope and aligning the rifle so that the reticle is directly positioned over the target. By positioning the reticle in this manner, a skilled marksman can shoot the rifle accurately so as to hit the target.

Under some circumstances, users may want to shoot their rifles at night or at a dark object. This may be true for persons in the military or in law enforcement who are involved in night-time operations. In order to use the reticle in these conditions of limited light, the reticle may be illuminated so that the user can see the reticle and align it with the target. When light is added to the reticle, it is possible that some of the light may bleed out of the rifle scope. This may occur by having the light exit the end of the rifle scope and propagate towards the target. If such light does escape the rifle scope, this can increase the likelihood that the user will be detected by surveillance. Thus, in situations in which the user would like to avoid detection, it may be very difficult and risky to use a lighted reticle.

BRIEF DESCRIPTION OF THE DRAWINGS

FIG. 3 is a side cross-sectional view of the eyepiece assembly shown in FIGS. 2A-2B;

FIG. 4 illustrates a side cross-sectional view of another eyepiece assembly that is configured to provide a lighted reticle and to reduce back light;

DETAILED DESCRIPTION

An eyepiece assembly for use in a rifle scope is disclosed. The eyepiece assembly may include an eyepiece that is made of a material that is transparent to light. The eyepiece assembly may also include a holographic reticle positioned within the eyepiece. The eyepiece assembly may also include a chrome reticle. The chrome reticle may be positioned so that the chrome reticle is aligned with the holographic reticle. The eyepiece assembly may also include a cover portion attached to the eyepiece.

The chrome reticle may have the same size and the same shape as the holographic reticle. The chrome reticle may be positioned within the cover portion of the eyepiece assembly. The holographic reticle may be a reflection hologram, such as a volume phase reflection hologram.

Another eyepiece assembly for use in a rifle scope is also disclosed. The eyepiece assembly may include an eyepiece that is made of a material that is transparent to light. The eyepiece assembly may also include a first reticle positioned within the eyepiece. The eyepiece assembly may also include a chrome reticle. The chrome reticle may be positioned so that the chrome reticle is aligned with the first reticle. The chrome reticle may have the same size and the same shape as the first reticle. The eyepiece assembly may also include a cover portion attached to the eyepiece.

The first reticle may be a holographic reticle. For example, the first reticle may be a reflection hologram, such as a volume phase reflection hologram.

Alternatively, the first reticle may be a surface relief grating reticle. The chrome reticle may be applied directly to the surface relief grating reticle.

The chrome reticle may be positioned within the cover portion of the eyepiece assembly. Alternatively, the chrome reticle may be positioned within the eyepiece.

Figure 1:
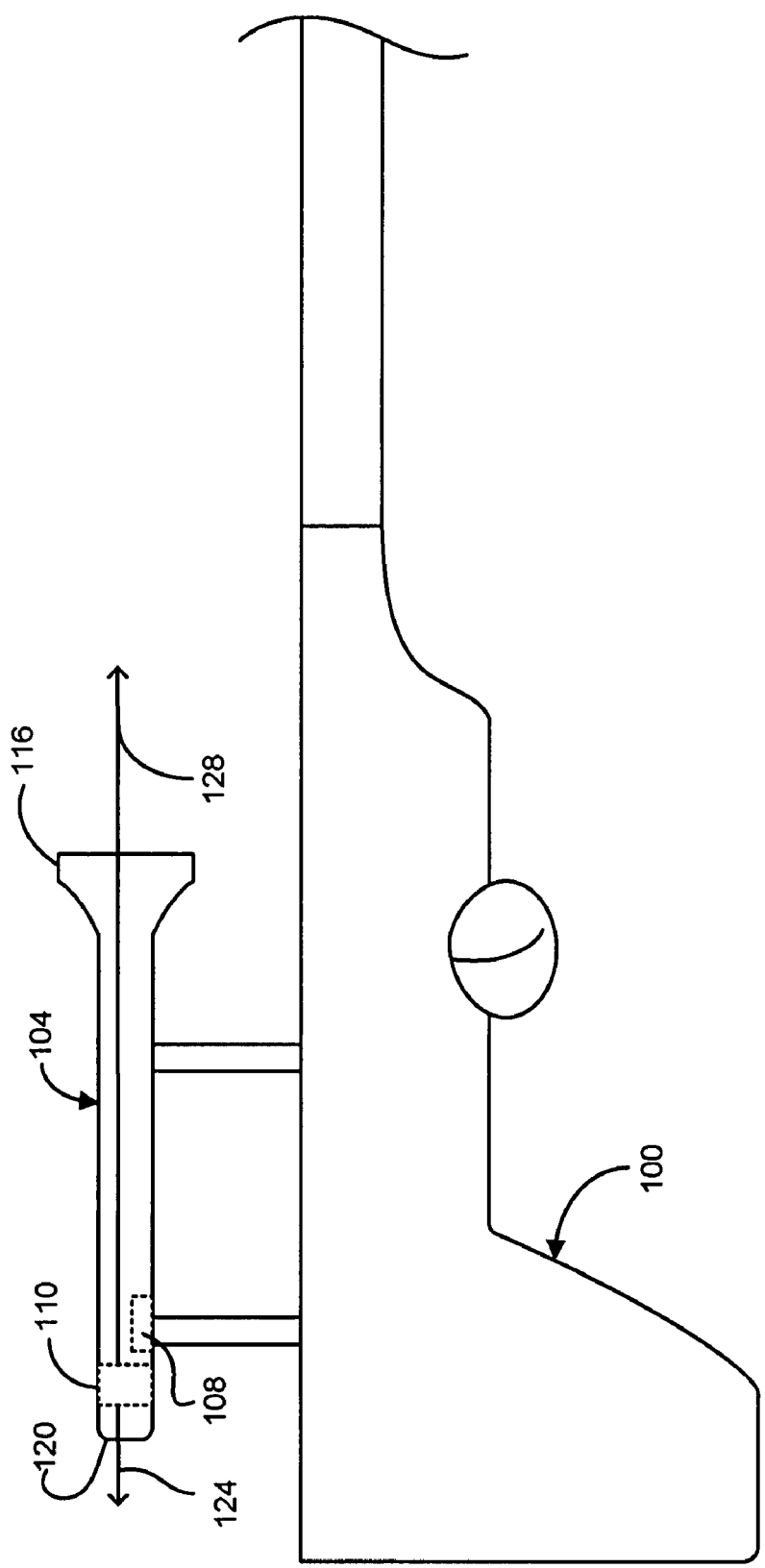
FIG. 1 illustrates an example of a rifle that includes a rifle scope.

FIG. 1 illustrates an example of a rifle 100 that includes a rifle scope 104. The rifle scope 104 may be designed such that a user may accurately aim the rifle 100 using the rifle scope 104. In other words, a user may position the rifle 100 so that a target is visible through the rifle scope 104.

The rifle scope 104 is shown with an eyepiece assembly 110. The eyepiece assembly 110 may be configured to provide a lighted reticle (not shown in FIG. 1) for the user of the rifle 100. The lighted reticle may permit the user to use the rifle 100 during situations where there is not a significant amount of light, such as at night.

The rifle scope 104 is also shown with a light source 108. The light source 108 may be designed to provide light to the eyepiece assembly 110. The light source 108 may be turned on during situations where there is not a significant amount of light. The light source 108 may be turned off if the rifle 100 is being used during the daytime or in situations where there is sufficient light from the surroundings so that the light source 108 is not necessary.

The light source 108 may be a light emitting diode (LED). Alternatively, other types of light sources 108 may be used.

When the light source 108 is turned on, some of the light produced by the light source 108 may exit the front end 120 of the scope 104 and enter the user's eye. This light may be referred to herein as front light 124. The front light 124 may permit the user to see as he or she looks through the eyepiece 112. At the same time, some of the light from the light source 108 may travel toward the back end 116 of the scope 104 (i.e., away from the user's eye). This light may be referred to herein as back light 128. It is possible that some of the back light 128 may bleed out of the rifle scope 104, which may be undesirable in situations in which the user would like to avoid detection. (The user of the scope 104 is not typically detected by the presence of the front light 124 because, in typical use, substantially all of the front light 124 enters the user's eye and is not dispersed into the user's surroundings.) The present disclosure relates to an eyepiece assembly 110 that is configured to provide a lighted reticle, and that is also configured to reduce and/or eliminate back light 128.

As mentioned, the rifle 100 shown in FIG. 1 is provided as an example only. The eyepiece assemblies described herein may be applied to rifles that are configured differently than the rifle 100 that is shown in FIG. 1.

Figure 2B:
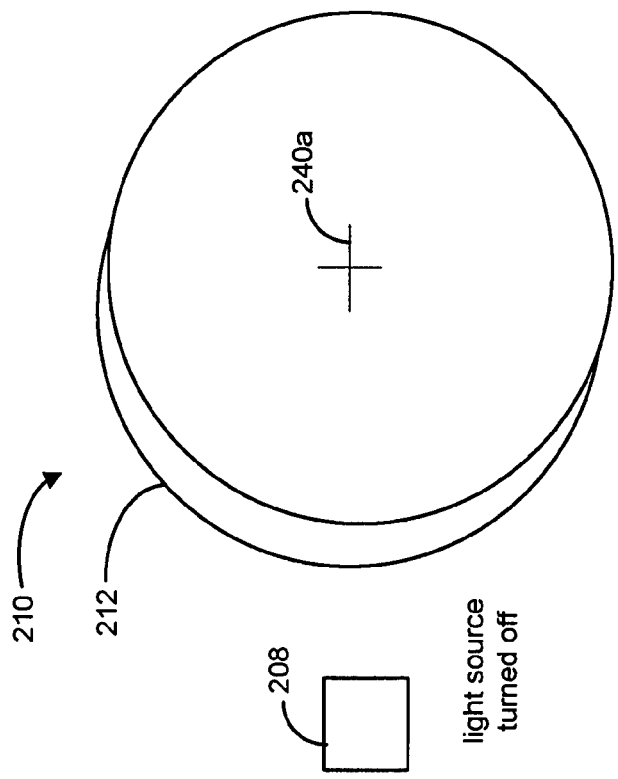
FIGS. 2A and 2B are perspective views of an eyepiece assembly that is configured to provide a lighted reticle and to reduce back light.
Figure 2A:
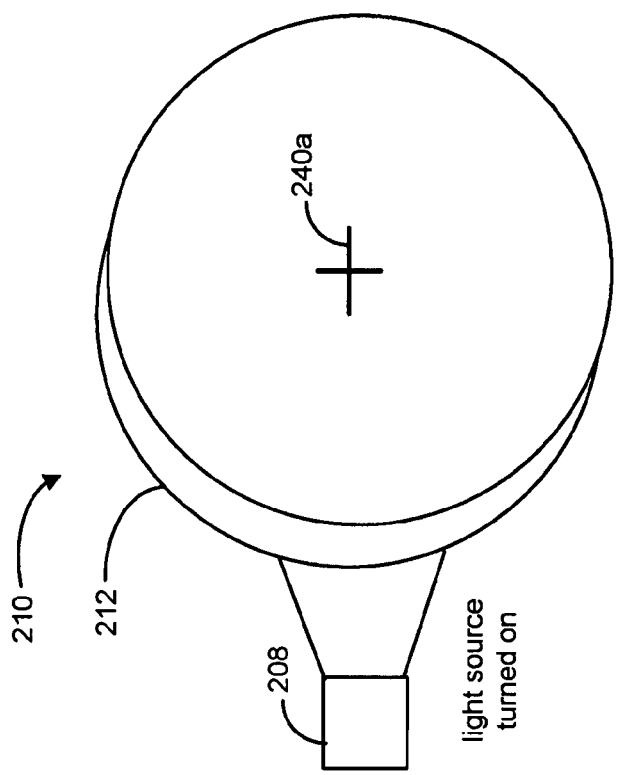

FIGS. 2A and 2B are perspective views of an eyepiece assembly 210 that is configured to provide a lighted reticle and to reduce back light 128. The eyepiece assembly 210 may be used in a rifle scope, such as the rifle scope 104 shown in FIG. 1.

The eyepiece assembly 210 is shown with an eyepiece 212. The eyepiece 212 may be made of glass or other similar material that is transparent to light and that allows the user to look through the rifle scope 104. The eyepiece 212 is shown as being cylindrical in shape. The eyepiece assembly 210 also includes a cover portion, which is not visible in FIGS. 2A-2B.

A light source 208 is also shown in FIGS. 2A-2B. The light source 208 may correspond to the light source 108 in the rifle scope 104 of FIG. 1.

As shown in FIG. 2A, the eyepiece 212 may be configured so that when it is illuminated with light from the light source 208, a holographic optical element 240a may be visible. The holographic optical element 240a may function as a reticle 240a for the rifle scope 104 when the light source 208 is turned on. This reticle 240a may be referred to herein as a holographic reticle 240a.

As shown in FIG. 2B, even when the light source 208 is turned off, the user may still be able to see the holographic reticle 240a, at least partially. However, the holographic reticle 240a may be considerably less visible when the light source 208 is turned off as compared to when the light source 208 is turned on.

The holographic reticle 240a may be any type of hologram. One example of a hologram that may be used is a volume phase reflection hologram. A volume phase reflection hologram may be efficient (i.e., it may be relatively bright when illuminated), and it may allow very little back light 128. Accordingly, by using a volume phase reflection hologram, the formation of back light 128 in the rifle scope 104 may be greatly reduced. A volume phase reflection hologram may be made from any volume phase holographic recording film. For example, a dichromate gelatin material, such as potassium dichromate, may be used.

In FIGS. 2A-2B, the holographic reticle 240a is shown in the shape of cross-hairs. However, the holographic reticle 240a may be shaped differently.

FIG. 3 is a side cross-sectional view of the eyepiece assembly 210 shown in FIGS. 2A-2B. The holographic reticle 240a is shown within the eyepiece 212.

A cover portion 346 of the eyepiece assembly 210 is shown attached to the eyepiece 212. The cover portion 346 may be attached to the eyepiece 212 by any suitable mechanism, such as optical adhesive.

Like the eyepiece 212, the cover portion 346 may be made of glass or other similar material that is transparent to light and that allows the user to look through the rifle scope 104. The cover portion 346 may be similar in shape to the eyepiece 212. FIG. 3 shows the thickness of the eyepiece 212 as being greater than the thickness of the cover portion 346. Alternatively, the thickness of the cover portion 346 may be equal to or greater than the thickness of the eyepiece 212.

When the light source 208 is turned on, both front light 224 and back light 228 may be present. However, the amount of back light 228 that is present may be less than the amount of back light 228 that would be present in the absence of the holographic reticle 240a. Accordingly, by using the holographic reticle 240a, the possibility that the user of the scope 104 may be detected as a result of the back light 228 exiting the scope 104 may be reduced somewhat.

FIG. 4 illustrates a side cross-sectional view of another eyepiece assembly 410 that is configured to provide a lighted reticle and to reduce back light 128. The eyepiece assembly 410 may be used in a rifle scope, such as the rifle scope 104 shown in FIG. 1.

The eyepiece assembly 410 is similar in some respects to the eyepiece assembly 210 that was described previously. Components of the eyepiece assembly 410 that are similar to components described previously are labeled with corresponding reference numbers. For example, the eyepiece assembly 410 is shown with an eyepiece 412. A holographic reticle 440a is shown within the eyepiece 412. A cover portion 446 is shown attached to the eyepiece 412.

In the eyepiece assembly 410 shown in FIG. 4, the cover portion 446 is shown with a reticle 440b that may be constructed of blackened chrome. This reticle 440b may be referred to herein as a chrome reticle 440b.

The chrome reticle 440b may have the same size and shape as the holographic reticle 440a. For example, if the holographic reticle 440a is shaped like cross-hairs, the chrome reticle 440b may also be shaped like cross-hairs. (Of course, both the holographic reticle 440a and the chrome reticle 440b may have shapes other than cross-hairs.)

The chrome reticle 440b is shown in a position where it is aligned with the holographic reticle 440a. With the holographic reticle 440a and the chrome reticle 440b positioned in this manner, the user may only see a single reticle 440 when looking through the scope 104, because the holographic reticle 440a and the chrome reticle 440b overlay each other (i.e., are positioned on top of each other).

The introduction of the chrome reticle 440b may block most, if not all, back light 128 from forming and/or exiting the scope 104. Accordingly, by using the chrome reticle 440b, the possibility that the user of the scope 104 may be detected as a result of the back light 128 exiting the scope 104 may be greatly reduced or even substantially eliminated.

Figure 5B:
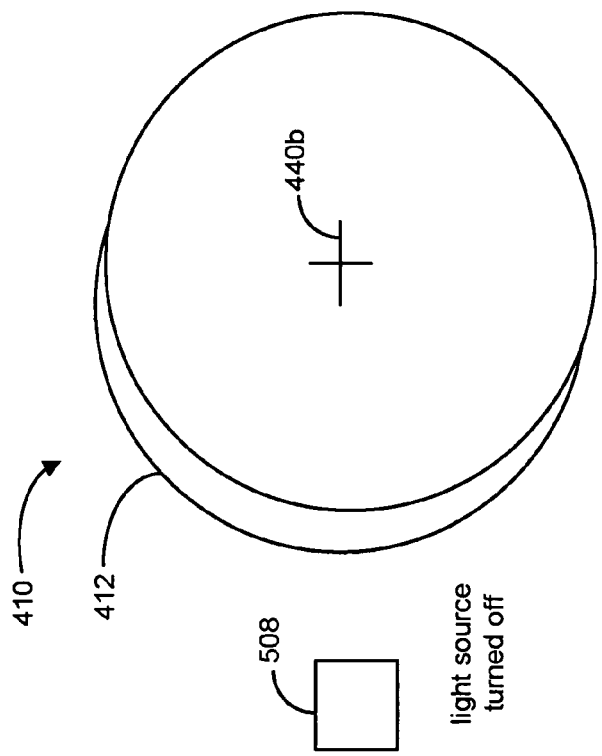
FIGS. 5A and 5B are perspective views of the eyepiece assembly of FIG. 4.
Figure 5A:
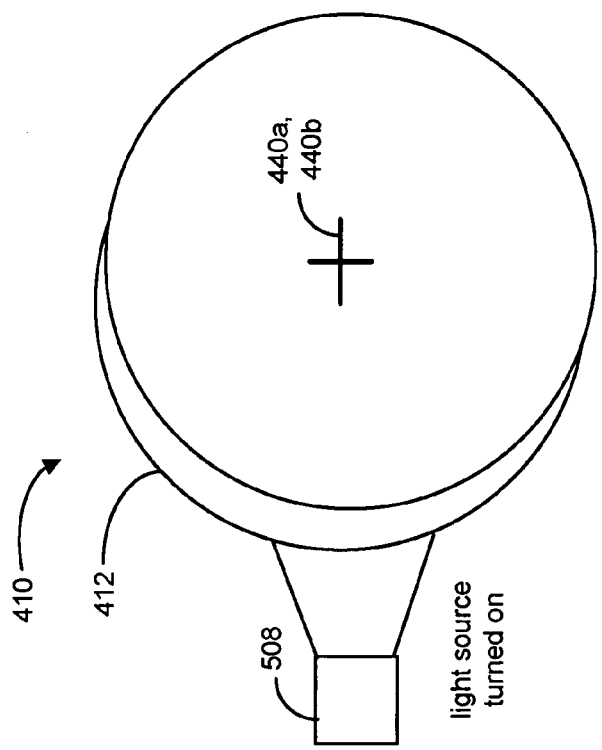

FIGS. 5A and 5B are perspective views of the eyepiece assembly 410 of FIG. 4. In particular, FIG. 5A illustrates the eyepiece assembly 410 when a light source 508 is turned on. FIG. 5B shows the eyepiece assembly 410 when the light source 508 is turned off.

As shown in FIG. 5A, when the light source 508 is turned on, the holographic reticle 440a may be illuminated so that it is visible to the user. The chrome reticle 440b may also be visible to the user.

As shown in FIG. 5B, when the light source 508 is turned off, the user may still be able to see a reticle 440b. In particular, the chrome reticle 440b is shown as being visible, even without direct illumination from the light source 508. The holographic reticle 440a may also be somewhat visible with the light source 508 turned off, although this is not shown in FIG. 5B. Accordingly, the illustrated eyepiece assembly 410 may allow the user to see a reticle 440 for aiming the rifle 100, regardless of whether the light source 508 is turned on.

Figure 6:
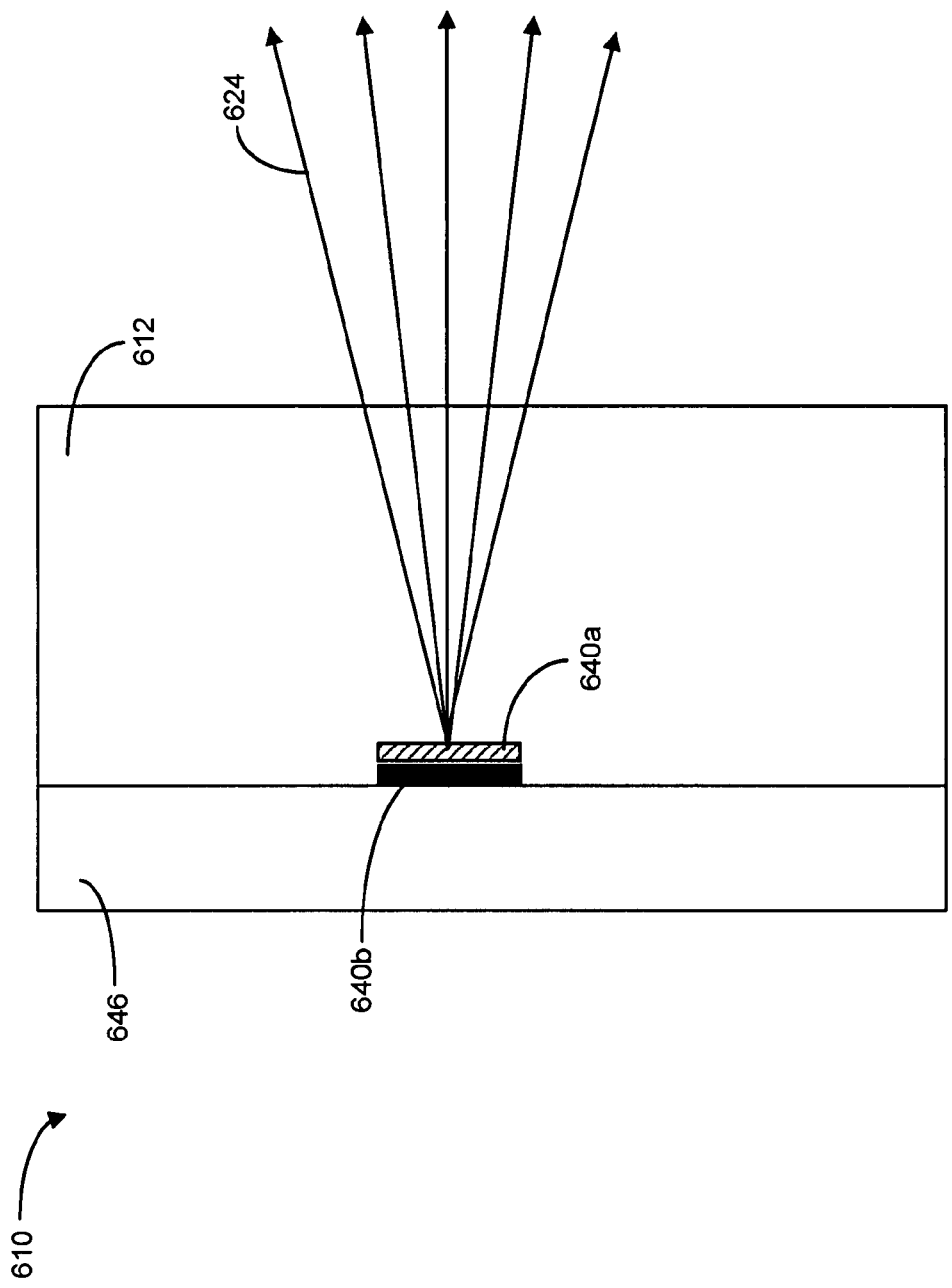
FIG. 6 is a side cross-sectional view of another eyepiece assembly that is configured to provide a lighted reticle and to reduce back light.

FIG. 6 is a side cross-sectional view of another eyepiece assembly 610 that is configured to provide a lighted reticle and to reduce back light 128. The eyepiece assembly 610 may be used in a rifle scope, such as the rifle scope 104 shown in FIG. 1.

The eyepiece assembly 610 is similar in some respects to the eyepiece assemblies 210, 410 that have been described previously. Components of the eyepiece assembly 610 that are similar to those described previously are labeled with corresponding reference numbers. For example, the eyepiece assembly 610 is shown with an eyepiece 612. A chrome reticle 640b is also shown. A cover portion 646 of the eyepiece assembly 610 is shown attached to the eyepiece 612.

In the eyepiece assembly 610 that is shown in FIG. 6, the eyepiece 612 includes a surface relief grating reticle 640a. The chrome reticle 640b is shown as having been applied directly to the surface relief grating reticle 640a. For example, the chrome reticle 640b may be made as a coating that covers the surface relief grating reticle 640a. Both the surface relief grating reticle 640a and the chrome reticle 640b are shown as being part of the eyepiece 612.

It is to be understood that the claims are not limited to the apparatus and methods described above. Various modifications may be made to the apparatus and methods described above without departing from the scope of the claims.

What is claimed is:

1. An eyepiece assembly for use in a rifle scope, comprising:
    an eyepiece that is made of a material that is transparent to light;
    a holographic reticle positioned within the eyepiece;
    a chrome reticle, wherein the chrome reticle is positioned so that the chrome reticle is aligned with the holographic reticle; and
    a cover portion attached to the eyepiece.

2. The eyepiece assembly of claim 1, wherein the chrome reticle has the same size and the same shape as the holographic reticle.

3. The eyepiece assembly of claim 1, wherein the holographic reticle is a reflection hologram.

4. The eyepiece assembly of claim 1, wherein the holographic reticle is a volume phase reflection hologram.

5. The eyepiece assembly of claim 1, wherein the chrome reticle is positioned within the cover portion of the eyepiece assembly.

6. An eyepiece assembly for use in a rifle scope, comprising:
    an eyepiece that is made of a material that is transparent to light;
    a first reticle positioned within the eyepiece;
    a chrome reticle, wherein the chrome reticle is positioned so that the chrome reticle is aligned with the first reticle, and wherein the chrome reticle has the same size and the same shape as the first reticle; and
    a cover portion attached to the eyepiece.

7. The eyepiece assembly of claim 6, wherein the first reticle is a holographic reticle.

8. The eyepiece assembly of claim 6, wherein the first reticle is a reflection hologram.

9. The eyepiece assembly of claim 6, wherein the first reticle is a volume phase reflection hologram.

10. The eyepiece assembly of claim 6, wherein the chrome reticle is positioned within the cover portion of the eyepiece assembly.

11. The eyepiece assembly of claim 6, wherein the first reticle is a surface relief grating reticle.

12. The eyepiece assembly of claim 11, wherein the chrome reticle is applied directly to the surface relief grating reticle.

13. The eyepiece assembly of claim 6, wherein the chrome reticle is positioned within the eyepiece.

* * * * *